Patented Apr. 22, 1947

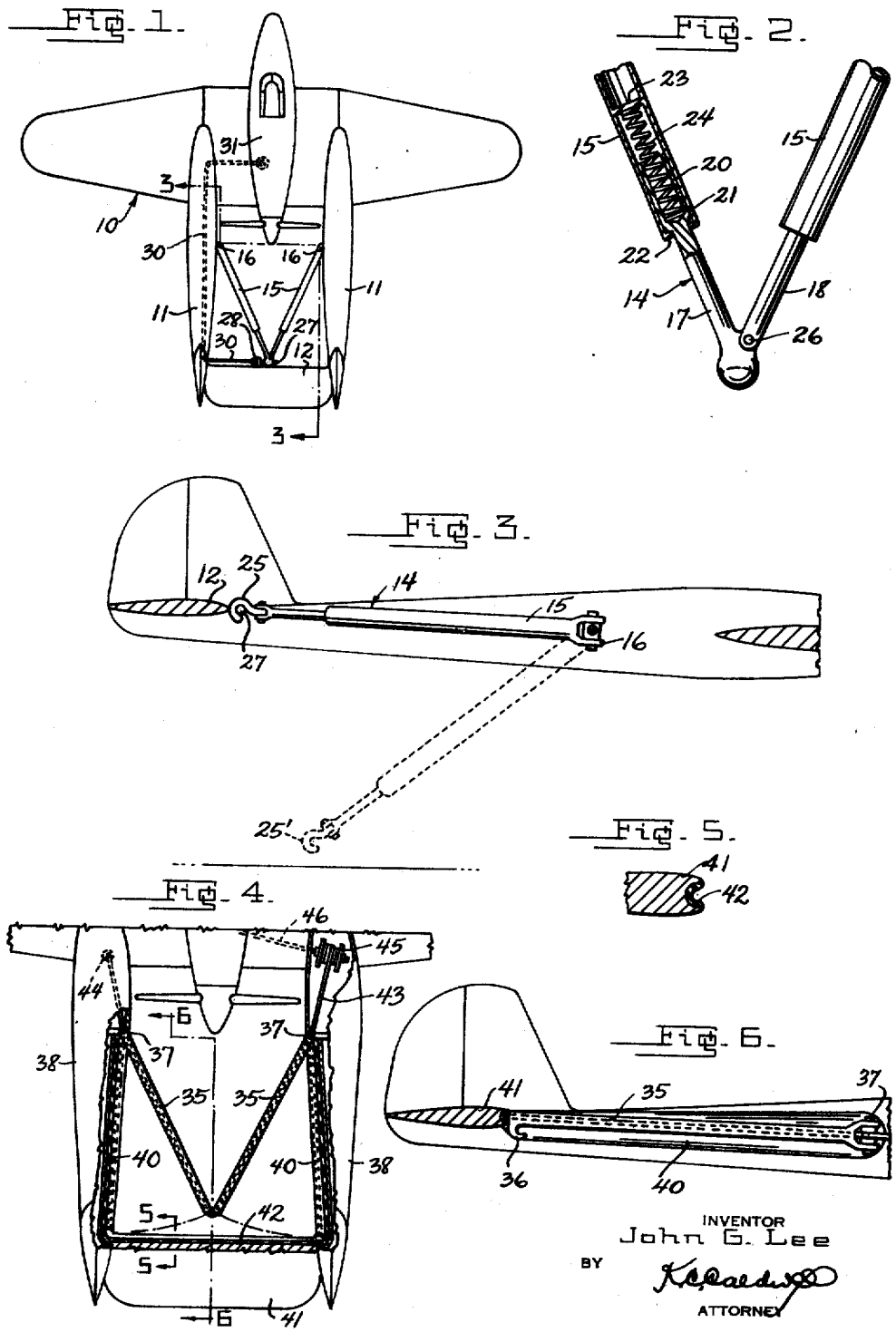

2,419,455

UNITED STATES PATENT OFFICE 2,419,455

AIRPLANE ARRESTING HOOK

John G. Lee, Farmington, Conn., assignor to United Aircraft Corporation, East Hartford, Conn., a corporation of Delaware Application October 21, 1941, Serial No. 415,974

4 Claims. (Cl. 244—110)

This invention relates to an airplane arresting hook, and has for an object to provide an improved means for arresting the forward movement of an airplane when alighting, upon shipboard or other restricted areas.

Ships designed for the purpose are provided with a flat open deck upon which the airplanes may alight, but in order that this operation be accomplished successfully, it is necessary to provide means for arresting the motion of the machines within the limits of the necessarily restricted space thereby afforded.

The approved practice at present is to mount above the landing deck spaced series of cables— a longitudinal series which are tightly stretched in horizontal position at a height of about eighteen inches and, substantially midway between such longitudinals and the deck, a few, for instance three, transverse cables which are yieldingly held in horizontal position by passing their weighted ends over pulleys at the sides. The airplanes are equipped with a number of small anchors or double-pointed grappling hooks which hang from the spacer-bar of the forward landing gear in position, when the wheels are running upon the deck, to engage the longitudinal cables and so hold the airplane down to the deck. It is an object of this invention to provide an airplane arresting means wherein the arresting hook is either entirely concealed or remains within the slip stream of the airplane so as to refrain from causing any aerodynamic disturbance to the speed or flight of the airplane while in the air, but which may be quickly and easily released to operative position when about to alight on the restricted landing field.

A further object of this invention is to so locate the arresting means that it will apply its arresting force to the airplane so far to the rear thereof that there will be no tendency for the tail to rise up and cause damage to the propeller or nose parts of the machine and on the rebound to the tail skid itself.

Still a further object of this invention is to provide an arresting means peculiarly adapted to airplanes of the type having twin fuselages.

With the foregoing and other objects in view, the invention consists in the construction, combination and arrangement of parts hereinafter described and illustrated in the drawings, in which:

Fig. 1 is an elevational view of an airplane to which this invention has been applied.

Fig. 2 is a fragmentary view, partly in section, of the arresting means of this invention.

Fig. 3 is a sectional view on line 3—3 of Fig. 1.

Fig. 4 is a fragmentary elevational view, partly in section, of a modified form of this invention; and Figs. 5 and 6 are sectional views on lines 5—5 and 6—6 of Fig. 4.

There is shown at 10 an airplane of the twin fuselage type provided with a pair of twin fuselages 11 connected at their rear by a horizontal stabilizer 12. The arresting means 14 of this invention includes a pair of sleeves 15. These sleeves 15 are universally pivoted as at 16 to the inner sides of the fuselages 11. Telescopically secured within the ends of sleeves 15 are the shanks 17 and 18, each shank 17 and 18 including a sleeve 20 to fit within the sleeve 15 and a shoulder 21 preventing the sleeve 20 from being withdrawn from the sleeve 15 beyond an end stop 22. Each sleeve 15 is also provided with an inner stop 23 acting as a base for a compression spring 24, which extends through sleeve 15 and into sleeve 20.

As will be apparent, the shanks 17 and 18 can each telescope into their respective sleeves 15 within the limits allowed by the relative length of the sleeve 20 and the distance between the stops 22 and 23. One of the shanks, as 17, ends in a hook 25, while the other shank 18 is pivotally secured to the shank 17 as at 26 adjacent the hook 25. The two shanks 17 and 18 thus form a V to each other. As shown in full lines in Figs. 1 and 3, the V of the shanks is kept within the plane of the fuselages 11 while in flight by means of a pin 27 extending through an eye 28 supported on the horizontal stabilizer 12. A control wire 30 secured to the pin 27 extends through one of the fuselages 11 to the pilot's cockpit 31 for suitable operation by the pilot when alighting.

In operation, the pilot in the cockpit 31 operates the control wire 30 to withdraw the pin 27, thus releasing the hook 25 and permitting it to drop down to the position 25' of Fig. 3. Although the air resistance will probably hold the hook 25 when released in the position 25', if desired, the universal pivots 16 may be provided with suitable stops preventing the hook 25 from dropping too far. In the position 25', the hook will engage one of the arresting cables of the landing area and thus apply a restraining force through the shanks 17 and 18 and sleeves 15 to the fuselages 11 at the pivot 16 which is located sufficiently to the rear of the airplane 10 that there will be no tendency for the plane to nose down.

Should the plane, when alighting, be somewhat off angle relative to the arresting cable, then one or more of the shanks 17 may telescope its sleeve 20 against the compression spring 24 within the sleeve 15, while the other shank holds against stop 22 to transmit the arresting force, the universal pivot 16 readily permitting this change in the angle of the V of the shanks 17 and 18.

In the form shown in Figs. 4, 5, and 6, the arresting means comprises a pair of hollow arms 35, each formed with a hook 36 at their rearward ends and each connected by a universal pivot to one of the twin fuselages 38. On the inner side of each fuselage 38 there is provided a countersunk rubber lined channel 40 within which arm 35 may rest while the airplane is in flight. The horizontal stabilizer 41 is provided with a continuation of this rubber lined channel 42.

Extending through the hook arms 35 is a control cable 43 having one end anchored at 44 within one fuselage and having its other end extending about a drum 45 provided with a suitable operating control 46 extending to a position adjacent the pilot's cockpit. In the operation of this form the arms 35 are each placed in their respective channels 40 while the cable 43 extending through these hollow arms also extends through the stabilizer channel 42.

When ready to alight, the pilot operates his control 46, causing drum 45 to wind up the control cable 43. This has the effect of drawing the arms 35 out of their channels 40 to form a V, as shown in Fig. 4, at the same time permitting their hooks 36 to drop down to arresting-cable-engaging position.

Other modifications and changes in the proportions and arrangement of the parts may be made by those skilled in the art without departing from the nature of the invention, within the scope of what is hereinafter claimed.

Having thus set forth and disclosed the nature of this invention, what is claimed is:

1. An airplane arresting hook comprising a V member, said V member including a pair of arms universally pivoted to the airplane at their spaced apart ends and provided with hook means at their apex end, and a control means cooperating with the apex ends of said arms holding said V member in the plane of the airplane and operable to release said apex end hook means to arresting position, said arms each including a contractible telescopic portion permitting the arm to shorten to change the angle of the V, said telescopic portion including means to normally bias said arms to their maximum length when in initial arresting position.

2. An airplane arresting hook comprising a V member, said V member including a pair of arms universally pivoted to the airplane at their spaced apart ends and provided with hook means at their apex end, control means cooperating with the apex ends of said arms holding said V member in the plane of the airplane and operable to release said apex end hook means to arresting position, said arms each including a contractible telescopic portion permitting the arm to shorten to change the angle of the V, said telescopic portion including means to normally bias said arms to their maximum length when in initial arresting position, and stop means in said telescopic portion limiting the length of the arm.

3. An airplane arresting hook comprising a V member, said V member including a pair of arms universally pivoted to the airplane at their spaced apart ends and provided with hook means at their apex end, and a control means cooperating with the apex ends of said arms holding said V member in the plane of the airplane and operable to release said apex end hook means to arresting position, said arms each including a contractible telescopic portion permitting the arm to shorten to change the angle of the V, said telescopic portion including means to normally bias said arms to their maximum length when in initial arresting position, said biasing means including yieldable means resisting the shortening of the arm.

4. An airplane arresting hook comprising a V member, said V member including a pair of arms universally pivoted to the airplane at their spaced apart ends and provided with hook means at their apex end, and a control means cooperating with the apex ends of said arms holding said V member in the plane of the airplane and operable to release said apex end hook means to arresting position, each of said arms including a hollow sleeve, the airplane including a pair of channels within which said arms may rest with their apex ends in spaced apart position, said control means including a cable extending through said hollow sleeve, said cable being anchored at one end and adapted, when operated by the control at its other end, to draw the apex ends out of their channels to apex or V position.

JOHN G. LEE.

REFERENCES CITED

The following references are of record in the file of this patent:

UNITED STATES PATENTS

| Number | Name | Date |
| --- | --- | --- |
| 1,760,881 | Minshall | June 3, 1930 |
| 1,997,945 | Oloszy | Apr. 16, 1935 |

FOREIGN PATENTS

| Number | Country | Date |
| --- | --- | --- |
| 794,924 | French | Dec. 26, 1935 |